(12) United States Patent
Cuesta Garcia (10) Patent No.: US 11,553,993 B2
(45) Date of Patent: Jan. 17, 2023

(54) HIGHLY SELF-TAPPING DENTAL IMPLANT SYSTEM WITH HYBRID CONNECTION AND PARALLEL DOUBLE CONE LOCKING BETWEEN PROSTHETIC ABUTMENT, IMPLANT AND INFERNAL SCREW

(71) Applicant: Julian Cuesta Garcia, Barcelona (ES)

(72) Inventor: Julian Cuesta Garcia, Barcelona (ES)

( * ) Notice: Subject to any disclaimer, the term of this patent is extended or adjusted under 35 U.S.C. 154(b) by 152 days.

(21) Appl. No.: 16/769,023

(22) PCT Filed: Dec. 3, 2018

(86) PCT No.: PCT/ES2018/000086
§ 371 (c)(1),
(2) Date: Jun. 2, 2020

(87) PCT Pub. No.: WO2019/110854
PCT Pub. Date: Jun. 13, 2019

(65) Prior Publication Data
US 2020/0330191 A1      Oct. 22, 2020

(30) Foreign Application Priority Data

Dec. 5, 2017   (ES) ............................... ES201700798

(51) Int. Cl.
*A61C 8/00*        (2006.01)
(52) U.S. Cl.
CPC .......... *A61C 8/0024* (2013.01); *A61C 8/0025* (2013.01)
(58) Field of Classification Search
CPC ... A61C 8/0024; A61C 8/0025; A61C 8/0022; A61C 8/0018; A61C 8/00
(Continued)

(56) References Cited

U.S. PATENT DOCUMENTS

| 5,954,504 A | 9/1999 | Misch et al. |
| 6,896,517 B1 | 5/2005 | Goeran et al. |

(Continued)

FOREIGN PATENT DOCUMENTS

| CN | 106491225 A | * | 3/2017 | |
| WO | WO-9703621 A1 | * | 2/1997 | ........... A61C 8/0022 |
| WO | WO-2008071368 A1 | * | 6/2008 | ........... A61B 17/888 |

OTHER PUBLICATIONS

Dr. Paolo Trisi published in The International Journal of Oral & Maxillofacial Implants 2011 ; 26 : 837-849 , entitled High versus Low Implant Insertion Torque : A Histologic, Histomorphometric, and Biomechanical Study in the Sheep Mandible.
(Continued)

*Primary Examiner* — Ralph A Lewis
*Assistant Examiner* — Mirayda A Aponte
(74) *Attorney, Agent, or Firm* — Porzio Bromberg & Newman P.C.

(57) ABSTRACT

Highly self-tapping dental implant system with hybrid cone type connection and interlocking rails, which allows high insertion (or removal) torque and double parallel cone locking between the implant, prosthetic abutment and internal screw, even in its 3.0 mm diameter embodiment, and gives the whole system high primary and secondary stability, optimal watertightness thanks to the double cone sealing, as well as predictable long-term fixation of the dental prosthesis on the implant.

8 Claims, 11 Drawing Sheets

(58) Field of Classification Search
USPC .................................... 433/174–176, 201.1
See application file for complete search history.

(56) References Cited

U.S. PATENT DOCUMENTS

| | | | | |
|---|---|---|---|---|
| 9,452,028 | B1* | 9/2016 | Niznick | A61C 8/0025 |
| 2003/0120279 | A1 | 6/2003 | Hansson | |
| 2004/0219488 | A1 | 11/2004 | Choi et al. | |
| 2009/0111072 | A1* | 4/2009 | Lombardo | A61C 8/0069 |
| | | | | 433/174 |
| 2011/0045437 | A1 | 2/2011 | Arni | |
| 2013/0177874 | A1* | 7/2013 | Hori | A61C 8/0068 |
| | | | | 433/174 |
| 2014/0272791 | A1* | 9/2014 | Sanchez | A61C 8/0075 |
| | | | | 433/173 |
| 2016/0270833 | A1 | 9/2016 | Manuel et al. | |

OTHER PUBLICATIONS

International Search Report, PCT/ES2018/00086, dated Oct. 4, 2019.

\* cited by examiner

HIGHLY SELF-TAPPING DENTAL IMPLANT SYSTEM WITH HYBRID CONNECTION AND PARALLEL DOUBLE CONE LOCKING BETWEEN PROSTHETIC ABUTMENT, IMPLANT AND INFERNAL SCREW

FIELD OF TECHNOLOGY

The present invention concerns a dental implant, in the field of oral implantology.

BACKGROUND OF THE INVENTION

Currently, in the world of implantology, there is a tendency to shorten time by optimizing processes. Implants are placed immediately after the extraction of the dental piece, whether they are single pieces or complete arches, and at the same time patients demand the prosthesis supported on the implants that have just been placed (immediate loading).

This type of treatment has its advantages and disadvantages: On the one hand, if the load received by the bone through the implant does not cause a micro-movement of more than 150 microns, a higher quality union with the bone will be achieved, while at the same time the maturation of the soft tissues is a clear advantage with respect to the conventional protocol.

But if the implants are few, small, their design does not dissipate the mechanical stress well, or they move with the occlusal load, we will have serious problems.

As a rule, the literature says that immediate loading protocol should not be done on implants placed with a torque of less than 30 Ncm, since below that insertion torque figure primary stability is considered to be low.

In implantology, two different types of stability are considered:
  Primary, a purely mechanical concept, and relating to the greater or lesser resistance to movement of a recently placed implant surrounded totally or partially by bone.
  Secondary or definitive, which is obtained when the implant also has a biological union with the bone, approximately two months after implantation.

In this regard, there is a study by Dr. Paolo Trisi published in The International Journal of Oral & Maxillofacial Implants 2011; 26: 837-849, entitled *High versus Low Implant Insertion Torque: A Histologic, Histomorphometric, and Biomechanical Study in the Sheep Mandible*. This is a comparative study of the same implants inserted into the jaws of sheep whose previous osteotomies varied in width or width.

In the narrow osteotomies, the torque applied when introducing the implant was an average of 110 Ncm, with peaks of 150 Ncm, while in the wide ones, the implants were introduced with an average torque of 30 Ncm, considered the ideal standard in the current state of the art. In it, primary and secondary stability is studied, as well as physiological and histomorphometric changes week by week, during the first six weeks.

The conclusions of this study are as follows:
"The results of the present study showed that a high implant insertion torque (up to 150 Ncm) in dense cortical bone, in a no-load protocol, does not induce bone necrosis or implant failure, but on the contrary, increases the primary and secondary stability of the implants, which is very relevant when immediate implant loading processes are performed.

Primary stability showed a marked reduction 7 days after implant placement, and one month later was necessary to achieve new stability from the neoformed bone (secondary)".

It is known that primary stability is lost due to the bone resorption of the cells immediately in contact with the implant, and at the same time, slowly but progressively, biological bonding is gained so that in the end the resulting stability is a mechanical-biological whole. The biological upward curve has been accelerated thanks to the microscopically textured surfaces that are capable of retaining the fibrin filaments and causing what is called contact osteogenesis, in which the first layer of new colonising bone cells is installed on the implant and from there they also proliferate in the opposite direction, towards the bone from which they originate.

However, this improvement path is limited, and it is difficult for the biological stability of the implant to be important before a period of six weeks, since we will always be obliged to wait for the biology, which we cannot change.

On the other hand, we can act in the area of primary mechanical stability by modifying the design of the implant. The idea is to achieve an implant that is inserted with high torque and that achieves levels of stability that are much higher than usual without damaging the surrounding bone.

SUMMARY OF THE INVENTION

With this invention, we will achieve a very high immediate initial stability, so that even during the period of bone reabsorption, and even though we have logically lost part of it due to this phenomenon, we will still have a lot of stability left, and it will be sufficient for the implant to remain below the critical 150 microns of movement at all times in the face of any external force.

At the same time, the threaded spiral pitch that is far removed from the implant body will dissipate occlusal forces considerably better than a classic cylindrical design.

The implant will be more stable under both shear and occlusal forces, thus allowing us to undertake complicated surgical situations with more guarantee of success.

The fact that the implant has been designed for special situations does not mean that it will not behave equally well under more usual conditions, because it will always be more stable than a classic cylindrical design, even after osseointegration. This is due to two factors: firstly because with this invention the bone will be more imbricated around the implant and secondly because we will have a greater percentage of bone implant contact, due to the greater torque in its insertion. As can be seen from Dr. Trisi's study, implants placed with high torque also have better secondary stability, since they achieve better quality osseointegration.

At the same time, the wide space created between the spirals allows for better vascularization and nutrition of the bone, which is very important in narrow spaces.

Among the factors to consider in the immediate (primary) mechanical stability are:
1.—Bone quality: The higher the bone density, the easier it is to achieve stability in general.
2.—Length and width of the implant appropriate to each situation.
3.—Design of the implant: This is the most important factor, and at the same time, the only parameter on which we can act.
4.—Insertion torque: Greater torque equals greater stability, as long as the implant penetrates the bone and does not rotate on itself or compress it excessively or break it.

It is directly related to the design of the implant, both its external shape and the connection.

In a given situation, with a certain bone quality, and once the right size implant has been chosen (length and diameter), the great difference will lie in the design of the implant when it comes to achieving a greater or lesser degree of mechanical stability, which is essential if we want to undertake simultaneous placement in the different complex situations:
  a) Post-extraction implantation
  b) Maxillary sinus lift
  c) Ridge Widening
  d) Guided bone regeneration processes
  e) Very porous bones, type III and IV.

But even in normal situations, this invention will always provide us with more advantages:

1.—It will guarantee a better bone-implant contact during the osseointegration process, which implies a higher quality of osseointegration (higher percentage of bone-implant contact, which is technically defined as BIC) and, consequently, a higher survival of the implant in the long term, 2.—It will avoid micro-movements that could alter that process (less osseointegration failures).

3.—Greater mechanical bone-implant imbrication, even after osseointegration.

4.—Better vascularization and nutrition of the surrounding bone, important in reduced spaces.

Having a great Primary Stability is, therefore, essential for the implant osseointegration, in any clinical situation, whether it is of risk (as the ones mentioned above) or not. The more complicated the situation (those mentioned above), the greater the difficulty in achieving it, but the greater the need to obtain it.

The protocols of immediate loading are today very demanded by the patients themselves since it avoids them going through a few months of transience in the prosthesis that are very uncomfortable.

Extraction of the tooth with simultaneous implantation and sometimes also with immediate loading included are procedures that have many followers, since if they are done correctly, they provide greater implant bone contact, and a higher survival rate of the implants in the long term.

There are multiple studies in the literature in which it is concluded that non-excessive loading is beneficial in terms of the quality of osseointegration and tissue maturation compared to the conventional protocol.

Cases of full arches with simultaneous placement of 4 or 6 implants, subsequent placement of titanium abutments with intraoral welding and immediate provisional or definitive prosthesis are increasingly frequent and in demand.

If we reduce the number of implants necessary for a complete rehabilitation, hygiene is better and the risk of periimplantitis is reduced, but the load that each of them has to bear is greater. Hence, an appropriate implant design, which dissipates the loads on the bone, is very important. From the increasingly widespread use of all these risky procedures that make up current implantology, the need arises to design an implant system specifically conceived for this purpose, which facilitates and ensures these processes. The need to design an implant system with which it is simple to obtain a high level of primary stability in an easy and predictable manner is therefore evident.

First premise:
It is necessary that the implant be placed with a high insertion torque:
To achieve this, it is essential to modify the classic design of the implant, both of its external part and of the connection.

Second premise:
It is essential that it is highly self-tapping, so that it does not block or turn on itself.

Third premise:
The connection must be able to withstand the high torque we are going to apply without getting dented and without the conveyor blocking the implant.

An important characteristic is the fact that this implant has an extremely sharp four-blade propeller at its apex.

Most of the implants on the market are not self-tapping, or are so in a very slight way, with blunt apexes, not very sharp spirals and not at all progressive cylindrical bodies. And they are often accompanied by connections that undergo plastic deformation beyond 70 or 80 Ncm.

This combination of not very self-tapping implant/cylindrical body/large diameter/weak connection is the most unfavourable, as during insertion the implant can be blocked, and when trying to unblock it, the connection is rounded and we will be forced to use a forceps for its extraction.

The invention serves to avoid all these problems.

Another great advantage inherent in the design is the fact that the bone is more imbricated in the implant, entering and embracing it around its entire perimeter, which provides even greater mechanical stability compared to a conventional cylindrical implant, due to the better distribution of loads. This applies both before and after osseointegration.

This system allows excellent stability to be achieved in three different ways:

1. Only with its apical part inserted in the bone: Most of the so-called immediate implants only contact in their apical third or middle third.

2. Only with the coronal part inserted: This would be the case of a sinus lift with simultaneous placement.

3. Only with its intermediate part inserted: For example, in sinus elevations in which, in addition to growing inside the sinus, we increase the height of the remaining ridge; or in guided bone regeneration procedures with intermediate implant stabilization.

Once the stability of the implant in the bone has been achieved, the next step is the long-term stability of the prosthesis, i.e. the reliability of the connection.

A major problem we face in daily practice is the loosening of the abutment screw with the consequent movement of the crown-abutment assembly. This is particularly relevant in single implants, and especially in those replacing molars, due to the high shear forces they have to withstand. The maximum expression of this problem is those unitary implants that replace molars and that are located as the last one in the arch, be it upper or lower. To avoid this loosening, we have designed a new double parallel cone block.

Another problem we are facing more and more often in the clinic is the need to remove implants that are osseointegrated, either because they are badly positioned or affected by periimplantitis. This invention allows us the important advantage of being able to remove them without the need for trephining, due to the fact that the novel connection admits the application of a high inverse torque, being able to remove the implant in an atraumatic way and preserving the bone.

BRIEF DESCRIPTION OF THE DRAWINGS

To complement the description being made and in order to help a better understanding of the characteristics of the invention, is accompanied as an integral part of that description, a set of drawings where with illustrative and not restrictive, has been represented as follows.

DETAILED DESCRIPTION OF THE INVENTION

The invention as shown in FIGS. 1-27 is a very self-tapping implant that penetrates the bone very progressively, which in turn is internally equipped with a connection that allows a high insertion torque to be applied without generating blockages of the insertion key and which also serves to block the prosthetic abutment thanks to the friction created by two parallel cones, that of the abutment on the implant and that of the screw on the abutment.

Figure 1:
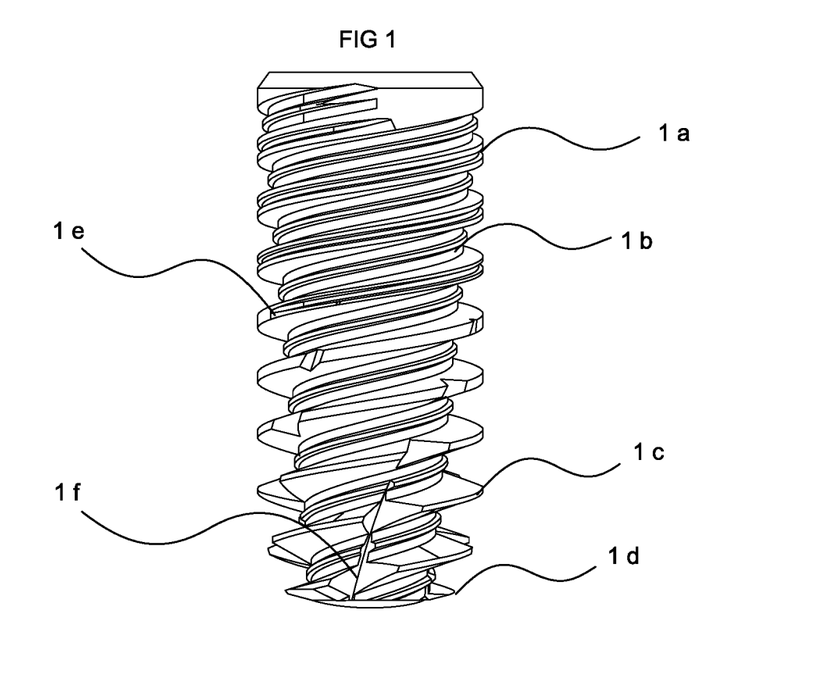
FIG. 1.—Elevation of the implant in a possible realization in terms of size and length.

The external shape of the implant is composed of a progressively tapered core (1b) that is different for each size of implant, which in turn is surrounded by very sharp spirals (1c) and separated from it, which begin in their most apical part by a four-bladed helix (1d) and then become progressively wider towards occlusal and approximately half the length of the implant undergoes a split (1e) that continues to the top of the implant (1a), providing the implant with an added vertical anchorage as shown in FIG. 1. This helix is twisted as we ascend towards the occlusal face of the implant, forming four oblique evacuation channels (1f).

With respect to the connection (FIG. 2), it is of the hybrid type: A cone of between 5 and 6 degrees (2a) is mixed with 6 vertical rails (2c) which form a hexagon similar to a torx connection.

Figure 2:
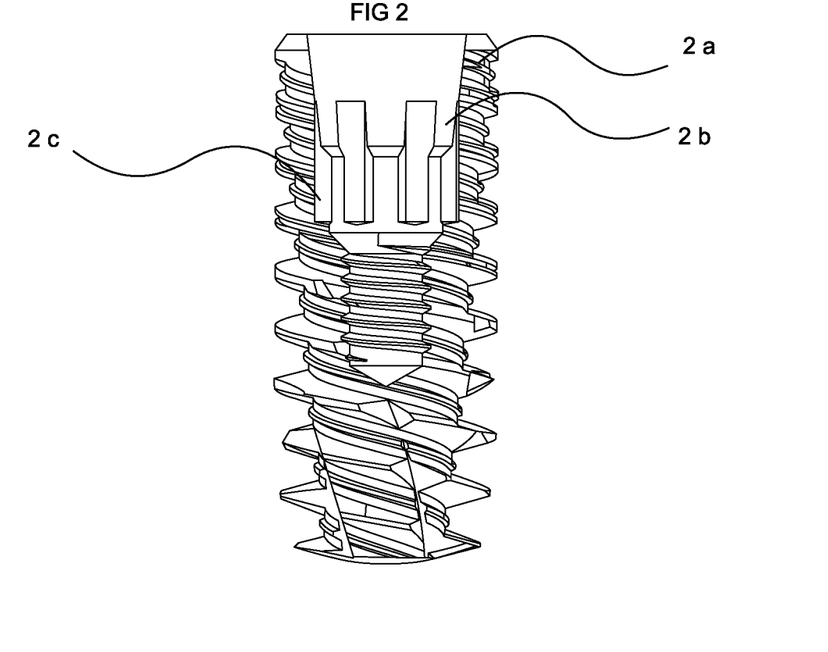
FIG. 2.—Elevation of the implant section and its wide connection, standard platform (SP).
Figure 3:
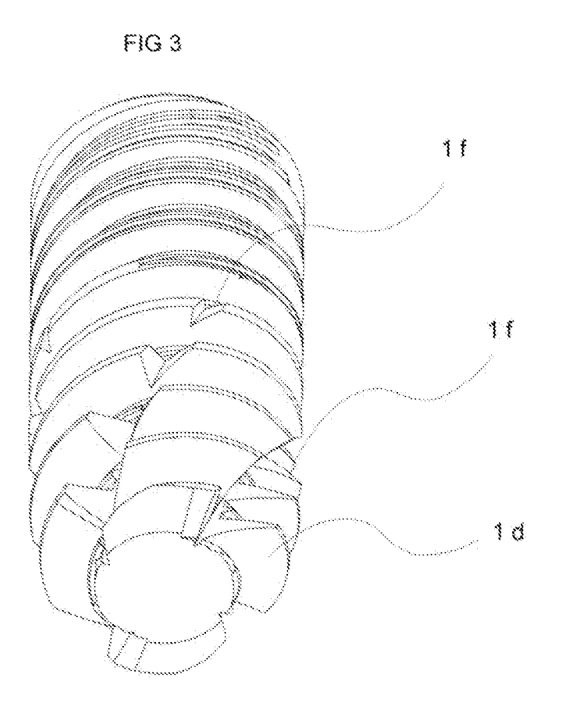
FIG. 3.—Perspective of the implant and its external shape.
Figure 4:
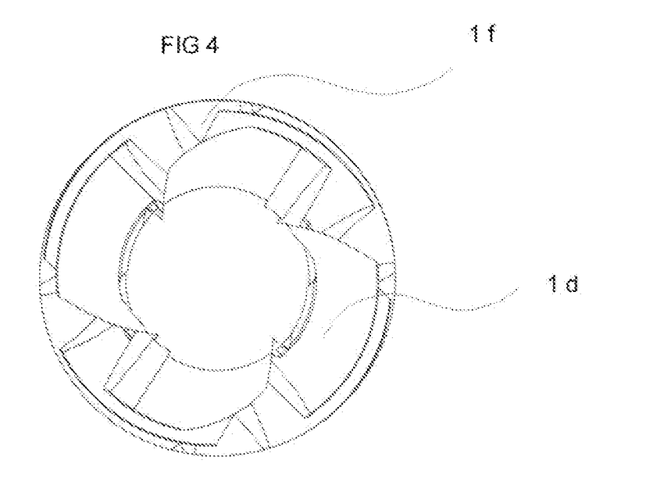
FIG. 4.—Apex of the implant.
Figure 5:
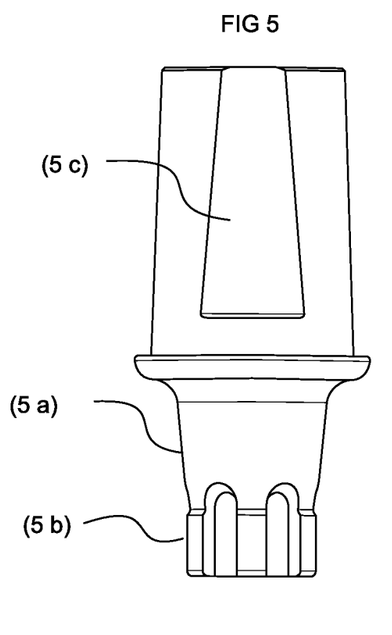
FIG. 5.—Elevation of the abutment in a possible implementation for wide connection, standard platform (SP).
Figure 6:
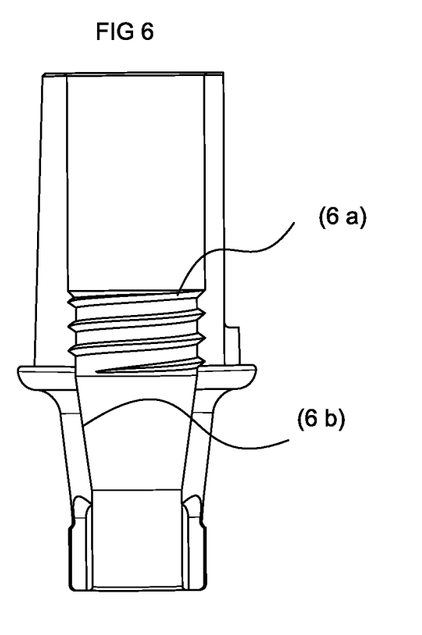
FIG. 6.—Section of the abutment for wide connection (SP)
Figure 7:
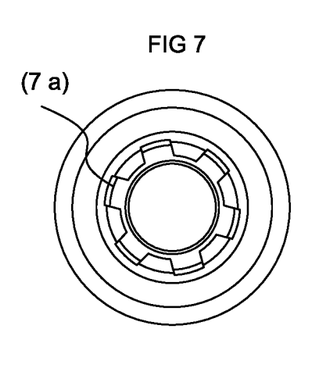
FIG. 7.—Apical view of the wide connecting pillar (SP)
Figure 8:
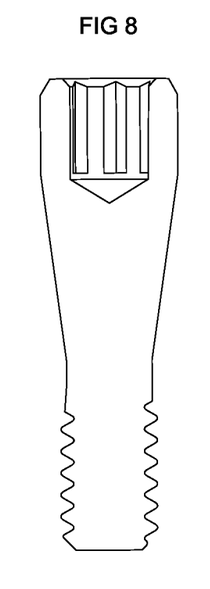
FIG. 8.—Section of the wide connection screw SP

There are three distinct areas in the connection, described from top to bottom, with the following characteristics:

(a) A first part, of approximately 1 mm, formed by a pure cone (2a).

(b) A second zone, hybrid, shared between the extension of the cone and the beginning of the vertical rails, which is also approximately 1 mm long (2b).

c) The third, lower, zone is composed exclusively of the vertical rails which form a torx-type hexagon that serves for indexing the pillar and transmitting torque, and is also approximately 1 mm long (2c).

This hybrid connection allows the mechanical platform of the hexagon to be wider, and therefore, supports more torque, and at the same time gives more stability to the implant-abutment assembly. This innovative feature allows us the great advantage of being able to remove the already osseointegrated implant by applying inverse torque in the case of poorly placed implants or those affected by periimplantitis, without trephining and maintaining the bone in a minimally invasive manner, which greatly facilitates the work of the clinician and improves future treatment.

Another advantage of this hybrid configuration is the fact that it is much easier for the impression coping to be ejected from the implant, since it is not necessary to reach the lower third of the connection in order to index the coping, it is sufficient for the coping to enter the hybrid area.

This fact is particularly important when impression taking in cases with very inclined and divergent implants, such as those increasingly common in All on Four, All on Six, tuberous implants, great bone vestibularization, etc.

Another innovative feature of this system is that the abutment extractor thread (FIG. 6) is at the height of the screw head (6a), and not at the height of the hexagon, as is usual in the market. This gives us the great advantage of being able to lock and unlock the rotating abutments whenever we want, an action that would not be possible without this location of the extractor thread. This greatly facilitates the parallelization of the abutments, both in the mouth and in the laboratory model.

Another new feature of this implant is the conical seating of the screw (9a with 6b) on the abutment, which is parallel to the conical seating of the abutment on the implant (5a with 2a), constituting a novel system of parallel double cone seating (13a and 13b).

The first great advantage of this configuration of double parallel cone is the fact that the set formed by implant (FIG. 12)—abutment (FIG. 11)—screw (FIG. 10), behaves as a whole, supporting the mechanical stress and distributing it much better.

Figure 13:
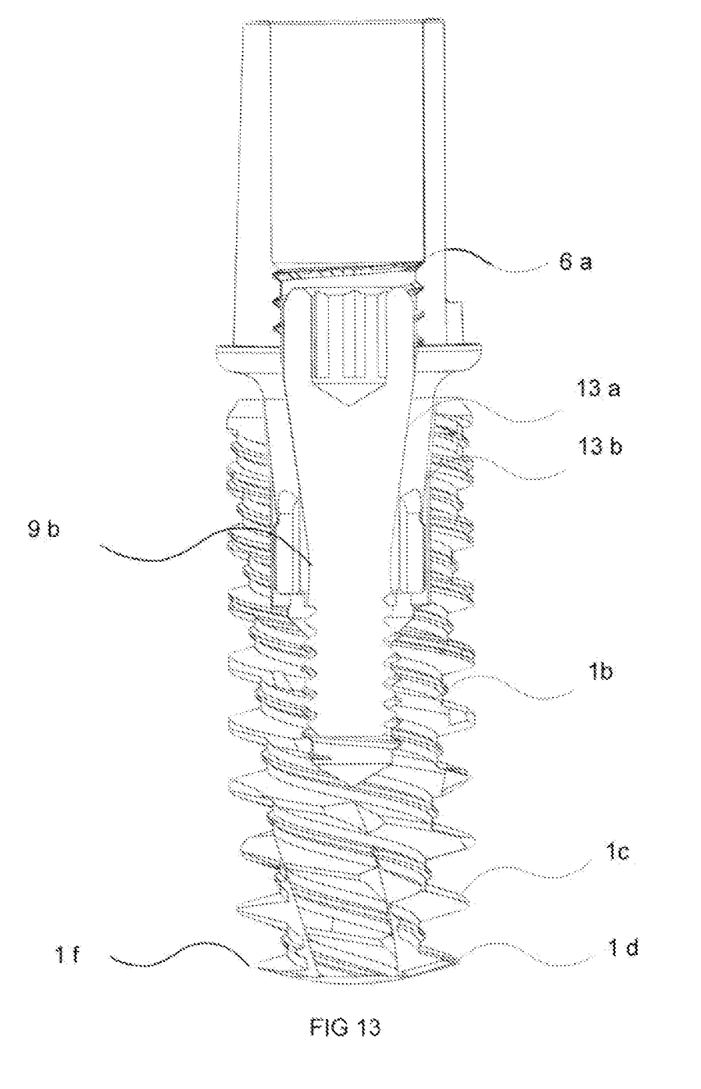
FIG. 13.—Section of the assembled assembly of a possible implementation of the "implant—abutment—screw" wide connection system (SP)
Figure 14:
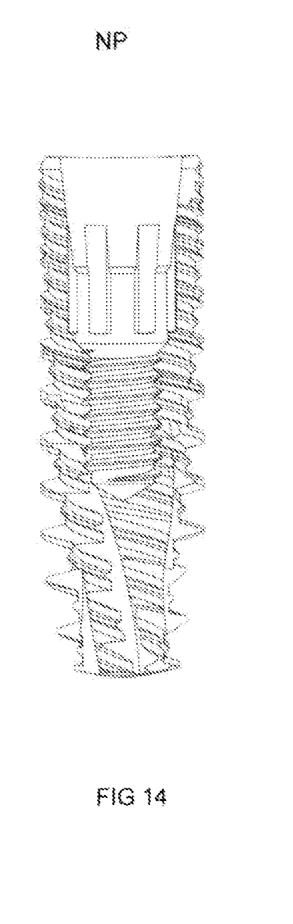
FIG. 14.—Elevation of the implant section in a possible narrow diameter realization (ø3.0 mm) and its narrow connection, narrow platform (NP)

The other great advantage of this parallel conical settlement is that the friction created by the screw on the abutment (13a) prevents loosening of the same, thus solving one of the great daily problems in clinical practice.

Figure 9:
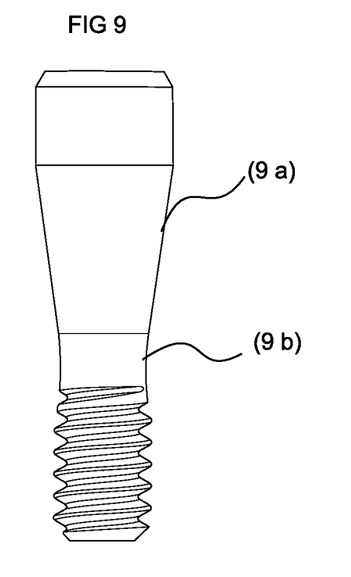
FIG. 9.—Height of the wide connection screw (SP)
Figure 10:
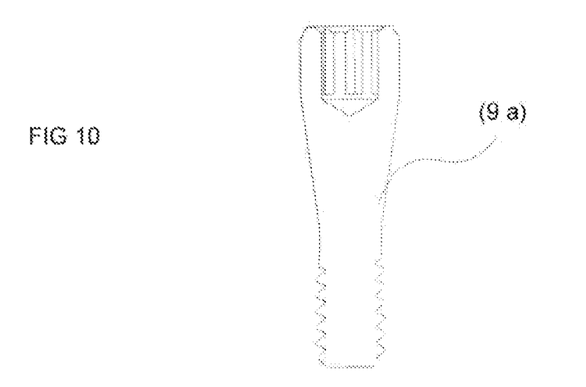
FIG. 10.—Elevation of the wide connection screw section (SP)
Figure 11:
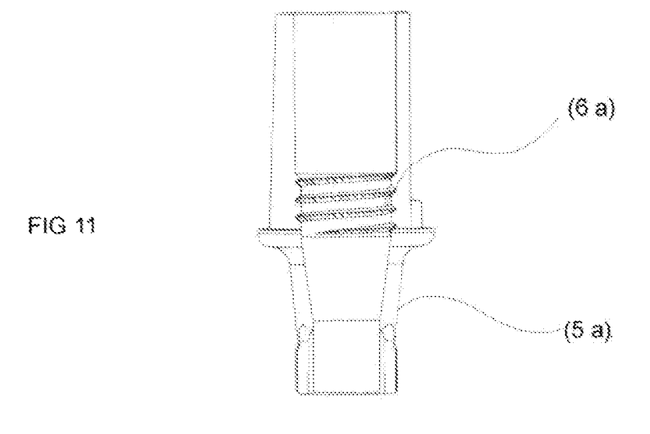
FIG. 11.—Elevation of the wide connection pillar section (SP)
Figure 12:
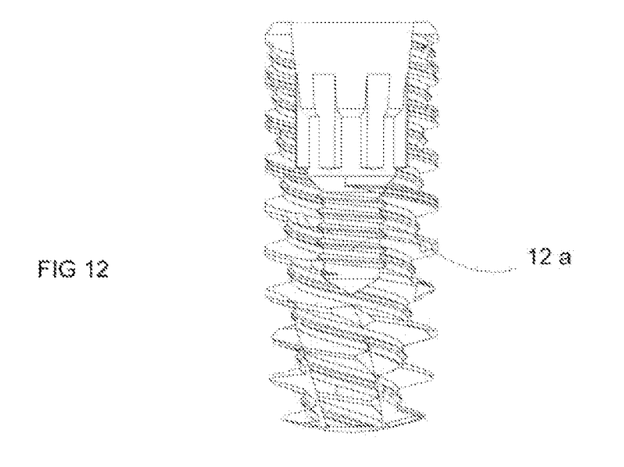
FIG. 12.—Elevation of the wide connection implant section (SP)

Another novel feature of this abutment screw, apart from its conical seating, is that it has an hourglass shape with a thinning in its middle part (9b), which facilitates its entry into the crown in cases of angled access chimneys (anterior sector).

This hourglass shape means that the implant-abutment-screw assembly flexes without deformation under high load, with the epicentre of the flexure being precisely the screw thinning area (9b).

The system has two platforms, narrow platform NP (FIG. 14) for the narrow diameter implant versions (3.0 mm, 3.25 mm and 3.5 mm) and wide platform SP (FIG. 15) for the wide diameter implant versions (4.0 mm and larger). The length of both connections (12a) is the same and the cone angles are also the same. Only the width and depth of the rails (2c) vary, which are larger in the wider connection.

Another new feature that improves the technique is that the double cone gives the system a double watertight seal.

The protocol for placing this implant consists of making a conical osteotomy staggered to the total length corresponding to the implant, in which the body of the implant, also conical, is only slightly superior, to allow the cutting coils to be introduced into the adjacent bone, generating stability without damaging it, cutting and not crushing it, thus preserving cell activity and physiology as much as possible.

In the case of very hard bone, the so-called type I, the cone of the osteotomy must be slightly wider.

The invention can be realized in various sizes as to length of the implant and diameter. Without this enumeration pretending to be restrictive, they can be made:

In sizes of ø 3.0 with the following lengths: L 7, L 8.5, L 10, L 11.5, L13 and L15, L17.

In sizes of ø 3.25 with the following lengths: L 7, L 8.5, L 10, L 11.5, L13 and L15, L17.

In sizes of ø 3.5 with the following lengths: L 7, L 8.5, L 10, L 11.5, L13 and L15, L17.

In sizes of ø 4 with the following lengths: L 7, L 8.5, L 10, L 11.5, L13 and L15, L17.

In sizes of ø 4.5 with the following lengths: L 7, L 8.5, L 10, L 11.5, L13 and L15, L17.

In sizes of ø 5 with the following lengths: L 7, L 8.5, L 10, L 11.5, L13 and L15, L17.

In sizes of ø 5.5 with the following lengths: L 7, L 8.5, L 10, L 11.5, L13 and L15, L17.

In sizes of ø 6 with the following lengths: L 7, L 8.5, L 10, L 11.5, L13 and L15, L17.

Figure 15:
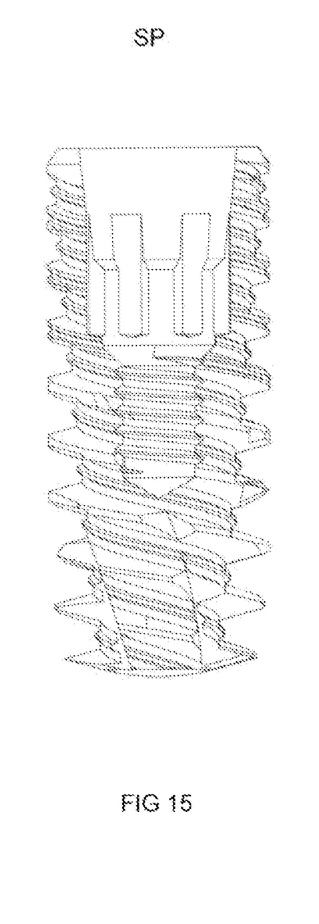
FIG. 15.—Elevation of the implant section in a possible wide diameter realization (ø equal or greater than 4.0 mm) with its wide connection (SP)
Figure 16:
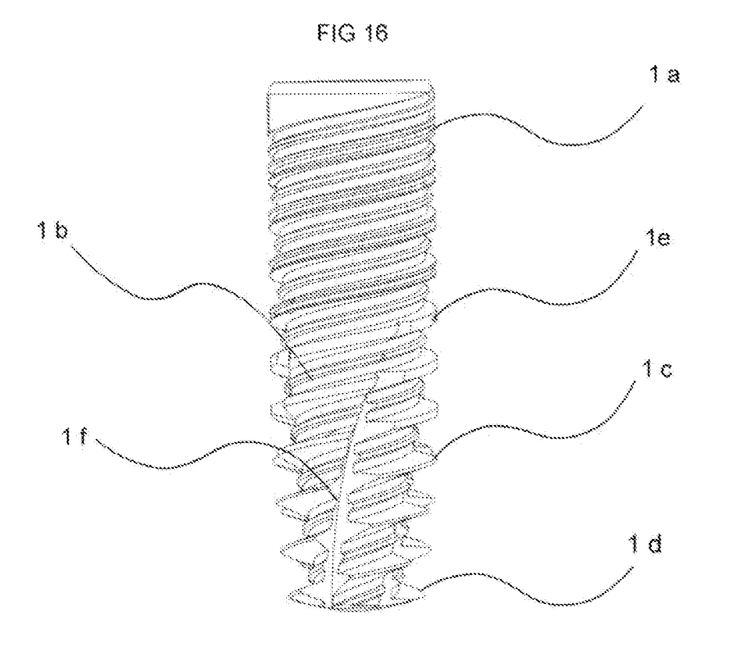
FIG. 16.—Elevation of the implant in a possible narrow diameter (ø3.0 mm) narrow connection realization (NP).
Figure 17:
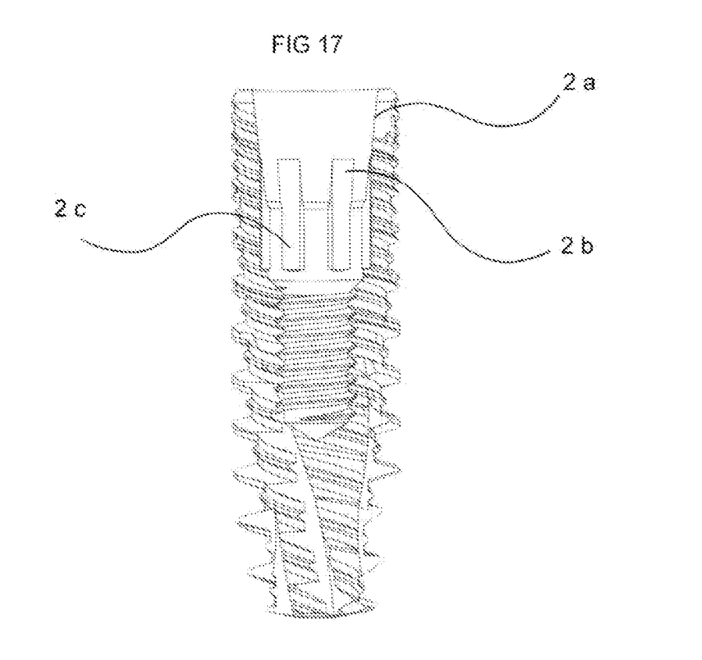
FIG. 17.—Section elevation of the narrow implant (ø3.0 mm) with its narrow connection (NP)
Figure 18:
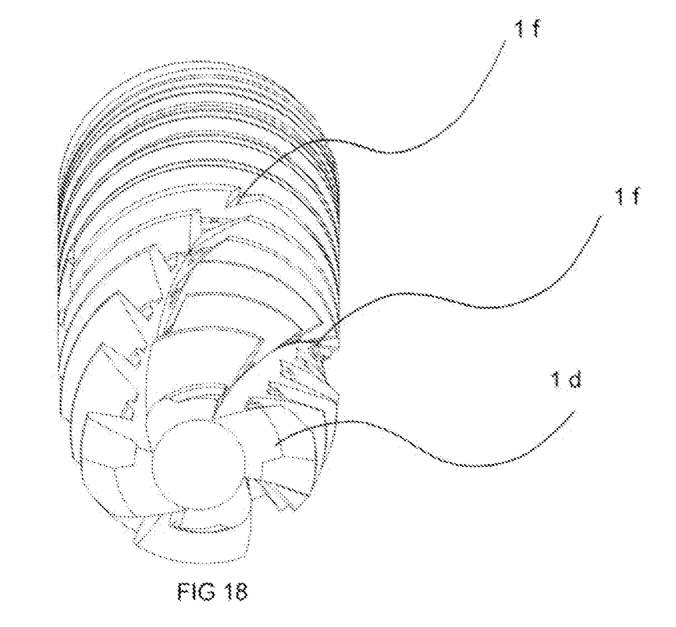
FIG. 18.—Perspective of the implant in a possible narrow diameter implementation (ø3.0 mm)
Figure 19:
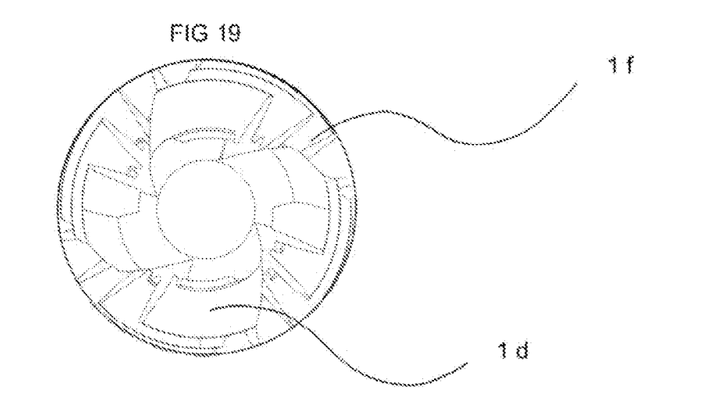
FIG. 19.—Apex of the narrow diameter implant (ø3.0 mm)
Figure 20:
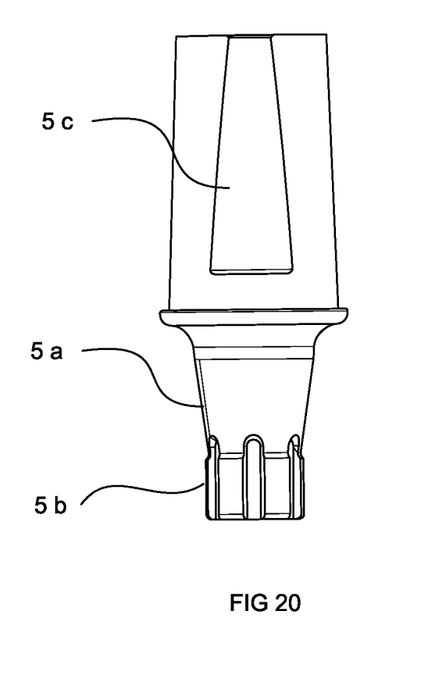
FIG. 20.—Elevation of the narrow connecting pillar (NP)
Figure 21:
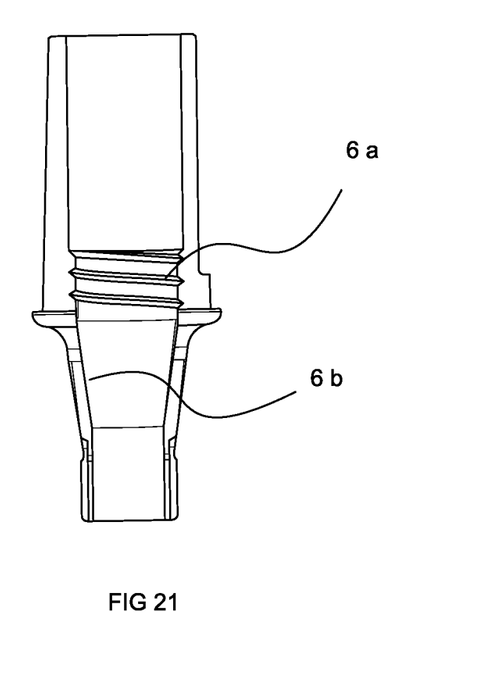
FIG. 21.—Elevation of the narrow connection pillar section (NP)
Figure 22:
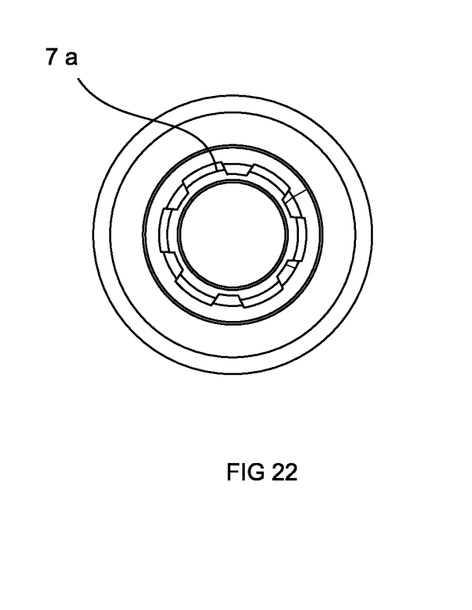
FIG. 22.—Apical view of the Narrow Connecting Pillar (NP)
Figure 23:
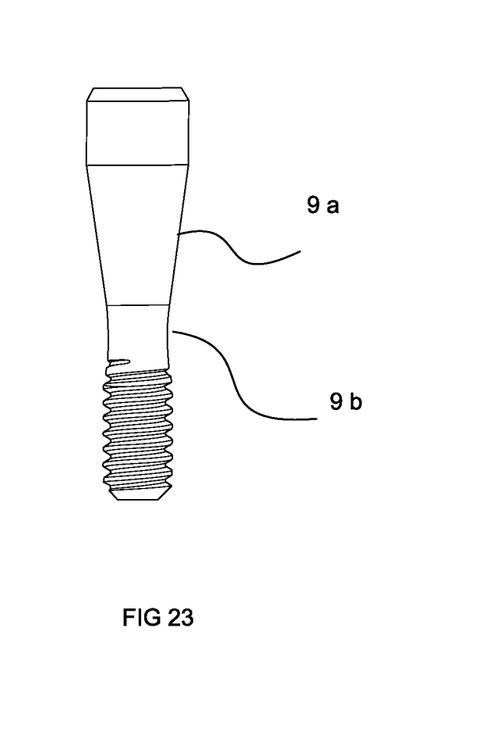
FIG. 23.—Elevation of the narrow connection screw (NP)
Figure 24:
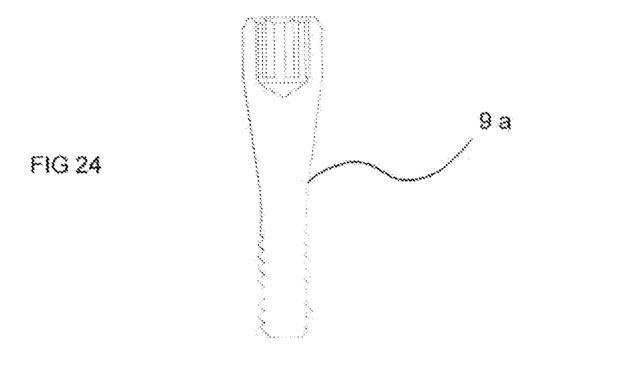
FIG. 24.—Narrow connection screw section (NP)
Figure 25:
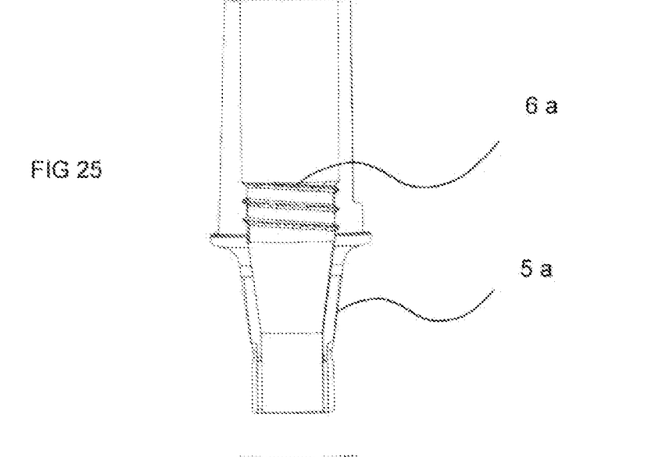
FIG. 25.—Narrow connecting pillar section (NP)
Figure 26:
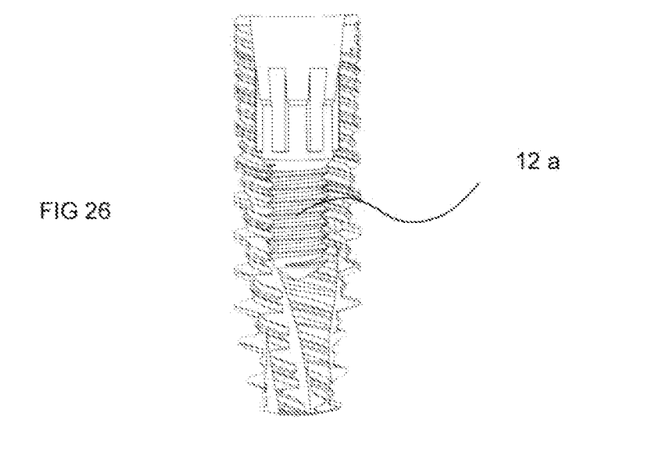
FIG. 26.—Narrow connection implant section (NP)
Figure 27:
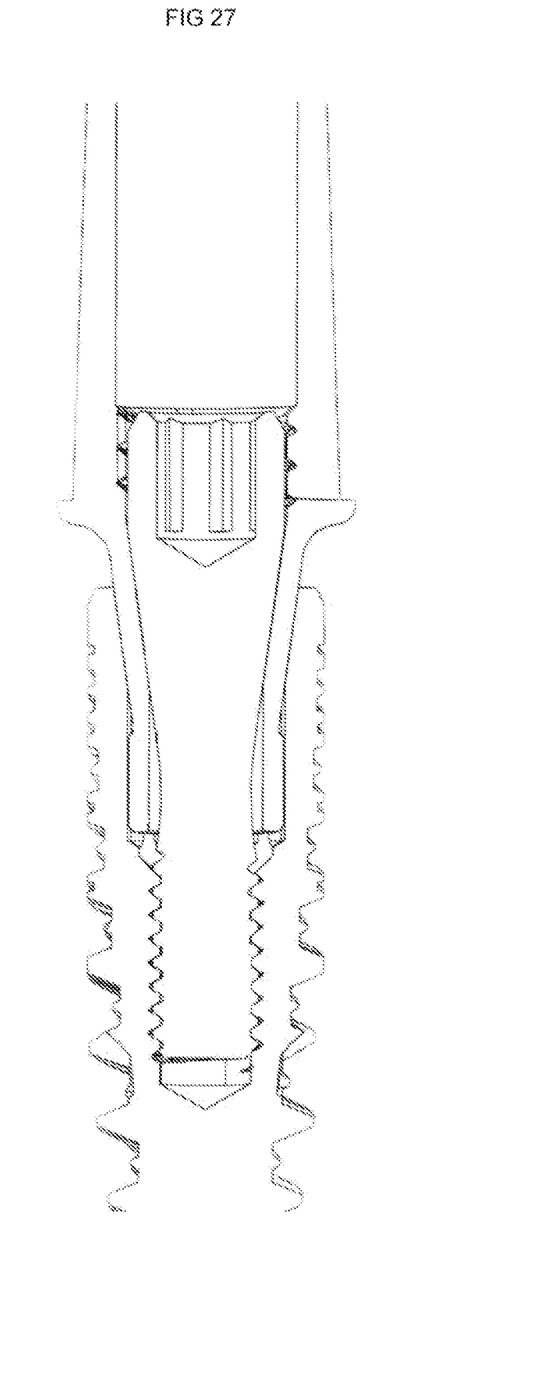
FIG. 27.—Section of the assembled assembly of a possible "implant-abutment-screw" system.

In the diameters 3.0, 3.25 and 3.5 the connection will be in its narrow version NP "narrow platform" (FIG. 14), and in the bigger diameters the connection will be standard SP "standard platform" (FIG. 15).

The invention claimed is:

1. A dental implant system comprising:
    an external part of an implant body formed of a progressive conical core of variable conicity depending on a diameter and length of the implant body, which is surrounded by cutting spirals separated from the conical core both horizontally and vertically;
    an internal part of the implant body comprising a blind hole with two elements: a hybrid connection and a female thread on which an abutment screw sits, the hybrid connection is a cone of between 5 and 6 degrees mixed with six vertical rails which form a hexagon;
    an abutment with a tapered seat on the implant body that prevents loosening of the prosthesis; and
    a tapered seating screw on the abutment, which tightens the abutment onto the implant by locking it;
    wherein the hybrid connection forms a parallel double cone lock, between the abutment and the implant, and between abutment and the abutment screw and wherein the hybrid connection which is 3 mm long, comprises the cone and six vertical rails which form a hexagon and that are intermingled in its central part of hybrid zone, forming 1 mm of the cone, 1 mm a central part of hybrid zone and 1 mm of rails.

2. The dental implant system according to claim 1, wherein the implant body includes in the external part a four blade helix in an apical part.

3. The dental implant system according to claim 2, wherein the external part of the implant body includes four oblique cutting channels that start from the four-blade helix and go up to the middle of the length of the implant body and serve as an escape distribution route of the bone chip produced during insertion.

4. The dental implant system according to claim 1 wherein the threads of the external part of the implant body show a progressive widening of an edge which, in the middle of the length of the implant body undergoes a splitting.

5. The dental implant system according to claim 1, wherein the tapered seating screw has a thinned hourglass shape in a center whose taper is parallel to the taper of the abutment and to the taper of the implant body at its connection.

6. The dental implant system according to claim 1, wherein the connection rails measuring 2 mm in total length between a hexagonal part and a hybrid part between the hexagon and the cone.

7. The dental implant system according to claim 1, wherein the abutment has an internal conical seat for the screw that tightens it and another external conical seat parallel to the previous one that it assembles the abutment with the implant body forming an internal double parallel cone lock with double sealing.

8. The dental implant system according to claim 7, wherein an abutment extraction thread is located at the height of the screw head once the assembly is assembled, and not at the height of the hexagon.

* * * * *